United States Patent
Mu et al.

(10) Patent No.: US 12,391,135 B2
(45) Date of Patent: Aug. 19, 2025

(54) CORD SET FOR V2V, V2L, OR G2V CHARGING OR POWER SUPPLY

(71) Applicant: Atieva, Inc., Newark, CA (US)

(72) Inventors: Mingkai Mu, Fremont, CA (US); Li Yang, Newark, CA (US); Bai Shao, Fremont, CA (US); Eric Magnus Bach, Newark, CA (US)

(73) Assignee: Atieva, Inc., Newark, CA (US)

( * ) Notice: Subject to any disclaimer, the term of this patent is extended or adjusted under 35 U.S.C. 154(b) by 844 days.

(21) Appl. No.: 17/452,635

(22) Filed: Oct. 28, 2021

(65) Prior Publication Data

US 2023/0137396 A1  May 4, 2023

(51) Int. Cl.
| | |
|---|---|
| *B60L 53/16* | (2019.01) |
| *B60L 53/18* | (2019.01) |
| *B60L 55/00* | (2019.01) |
| *B60L 58/12* | (2019.01) |
| *H02J 7/34* | (2006.01) |

(52) U.S. Cl.
CPC .............. *B60L 53/16* (2019.02); *B60L 53/18* (2019.02); *B60L 55/00* (2019.02); *B60L 58/12* (2019.02); *H02J 7/342* (2020.01)

(58) Field of Classification Search
CPC .......... B60L 53/16; B60L 55/00; B60L 58/12; B60L 53/18; H02J 7/342
USPC ......................................................... 320/104
See application file for complete search history.

(56) References Cited

U.S. PATENT DOCUMENTS

| | | | |
|---|---|---|---|
| 4,449,089 A | 5/1984 | Winkler | |
| 2010/0207588 A1* | 8/2010 | Lowenthal | B60L 53/65 |
| | | | 320/109 |
| 2011/0245987 A1* | 10/2011 | Pratt | H02J 7/0068 |
| | | | 320/132 |
| 2012/0007554 A1* | 1/2012 | Kanamori | H01M 10/44 |
| | | | 320/109 |
| 2013/0020992 A1* | 1/2013 | Wu | B60L 53/63 |
| | | | 320/109 |

(Continued)

FOREIGN PATENT DOCUMENTS

| | | | | |
|---|---|---|---|---|
| DE | 102012220351 A1 * | 5/2013 | .......... | B60L 11/1816 |
| EP | 2617600 A2 * | 7/2013 | .......... | B60L 11/1825 |

(Continued)

OTHER PUBLICATIONS

International Search Report and Written Opinion for PCT Application No. PCT/US2022/078896, mailed on Feb. 15, 2023, 14 pages.

*Primary Examiner* — Suresh Memula
(74) *Attorney, Agent, or Firm* — Brake Hughes Bellermann LLP

(57) ABSTRACT

A cord set comprises: electric-vehicle supply equipment (EVSE) comprising circuitry, the EVSE having a receptacle; a first charging gun coupled to an end of a first cord, wherein a first connector is coupled to an opposite end of the first cord, and wherein the first connector is configured to be coupled with the receptacle for vehicle-to-vehicle charging; a second charging gun coupled to an end of a second cord, wherein an opposite end of the second cord is coupled to the EVSE; and a grid cord, wherein a second connector is coupled to an end of the grid cord, and wherein the second connector is configured to be coupled with the receptacle for grid-to-vehicle charging.

21 Claims, 11 Drawing Sheets

(56) References Cited

U.S. PATENT DOCUMENTS

| | | | |
|---|---|---|---|
| 2014/0028257 A1* | 1/2014 | Nishida | B60L 53/66 |
| | | | 320/109 |
| 2017/0136881 A1 | 5/2017 | Ricci | |
| 2018/0201144 A1* | 7/2018 | Newman | B60D 1/62 |
| 2019/0001833 A1 | 1/2019 | Coburn et al. | |
| 2019/0047427 A1 | 2/2019 | Pogorelik | |
| 2019/0165591 A1 | 5/2019 | Kisacikoglu et al. | |
| 2021/0252990 A1* | 8/2021 | Wang | B60L 53/22 |
| 2021/0370795 A1* | 12/2021 | Kydd | H02J 3/322 |
| 2022/0176840 A1* | 6/2022 | Harris | H02J 7/0029 |
| 2023/0138878 A1* | 5/2023 | Shin | B60L 53/60 |
| | | | 320/109 |
| 2023/0256858 A1* | 8/2023 | Sun | B60L 53/305 |
| | | | 320/109 |
| 2023/0322116 A1* | 10/2023 | Mies | B60L 53/66 |
| | | | 320/109 |

FOREIGN PATENT DOCUMENTS

| | | | | |
|---|---|---|---|---|
| KR | 20240056928 A * | 5/2024 | | |
| WO | WO-2011102515 A1 * | 8/2011 | | B60L 53/30 |
| WO | 2011127446 A2 | 10/2011 | | |
| WO | WO-2013021550 A1 * | 2/2013 | | B60L 11/1838 |
| WO | WO-2014174808 A1 * | 10/2014 | | B60L 11/1803 |
| WO | WO-2021182815 A2 * | 9/2021 | | B60L 3/0046 |

* cited by examiner

CORD SET FOR V2V, V2L, OR G2V CHARGING OR POWER SUPPLY

TECHNICAL FIELD

This document relates to a cord set for V2V, V2L, or G2V charging or power supply.

BACKGROUND

In recent years, electric vehicle (EV) technology has continued to develop, and an increasing number of people are choosing to have an EV as a personal vehicle. An EV has an onboard battery pack or other energy storage. In the past, EV batteries have been utilized as the source of energy for the EV itself (e.g., for its powertrain and electrical components).

SUMMARY

In a first aspect, a cord set comprises: electric-vehicle supply equipment (EVSE) comprising circuitry, the EVSE having a receptacle; a first charging gun coupled to an end of a first cord, wherein a first connector is coupled to an opposite end of the first cord, and wherein the first connector is configured to be coupled with the receptacle for vehicle-to-vehicle charging; a second charging gun coupled to an end of a second cord, wherein an opposite end of the second cord is coupled to the EVSE; and a grid cord, wherein a second connector is coupled to an end of the grid cord, and wherein the second connector is configured to be coupled with the receptacle for grid-to-vehicle charging.

Implementations can include any or all of the following features. The EVSE further comprises a voltage divider, wherein the first charging gun has a proximity pin, and wherein coupling of the first connector with the receptacle causes the voltage divider to be coupled to the proximity pin through the first cord. The voltage divider includes at least a resistor, wherein coupling the resistor to the proximity pin through the first cord lowers a voltage at the proximity pin. The EVSE detects whether the first or second connector is coupled with the receptacle. Each of the first and second charging guns is a J1772 charging gun. The cord set is configured so that vehicle-to-vehicle charging with the first connector coupled with the receptacle involves the first charging gun being coupled to a donor electric vehicle, and the second charging gun being coupled to an acceptor electric vehicle. The cord set is configured so that grid-to-vehicle charging with the second connector coupled with the receptacle involves the second charging gun being coupled to an electric vehicle to be charged.

In a second aspect, a method comprises: providing, by a first electric vehicle (EV), a first voltage at a proximity pin, wherein a first cord couples the proximity pin to EV supply equipment (EVSE); detecting, by the first EV, a second voltage at the proximity pin; based on the second voltage having a first level, initiating, by the first EV, grid-to-vehicle charging of the first EV; and based on the second voltage having a second level different from the first level, initiating, by the first EV, vehicle-to-vehicle charging with the first EV as a donor vehicle and a second EV as an acceptor vehicle.

Implementations can include any or all of the following features. The method further comprises prompting, in response to the second voltage having the second level, a user for input whether to initiate the vehicle-to-vehicle charging. The method further comprises detecting, by the first EV and for the grid-to-vehicle charging, a third voltage on a pilot pin coupled to the EVSE by the cord, wherein the third voltage represents a level of current available for the grid-to-vehicle charging. The method further comprises providing, by the first EV and for the vehicle-to-vehicle charging, a third voltage on a pilot pin coupled to the EVSE by the cord, wherein the third voltage represents a level of current available for the vehicle-to-vehicle charging. The method further comprises terminating, by the first EV, the vehicle-to-vehicle charging. The first EV is associated with an application, the method further comprising receiving, by the first EV, a stop command generated by the application, wherein the first EV terminates the vehicle-to-vehicle charging in response to receiving the stop command. The first EV has a touchscreen, the method further comprising receiving, by the first EV, a stop command entered by a user using the touchscreen, wherein the first EV terminates the vehicle-to-vehicle charging in response to receiving the stop command. A charging gun is coupled to an end of the cord, wherein the charging gun is coupled to the first EV for the vehicle-to-vehicle charging, wherein the charging gun has a button, and wherein the first EV terminates the vehicle-to-vehicle charging in response to the button being pressed. The method further comprises receiving, by the first EV, a signal from the EVSE, wherein the first EV terminates the vehicle-to-vehicle charging in response to the signal. A charging gun is coupled to the second EV for the vehicle-to-vehicle charging, wherein the charging gun has a button, and wherein sending of the signal was triggered by pressing of the button. The method further comprises detecting, by the first EV, a fault in the vehicle-to-vehicle charging, and changing a state of the first vehicle in response to the fault.

In a third aspect, a cord set comprises: a power strip comprising circuitry, the power strip having a receptacle; a first charging gun coupled to an end of a cord, wherein a first connector is coupled to an opposite end of the cord, and wherein the first connector is configured to be coupled with the receptacle for vehicle-to-load power supply; and a grid cord, wherein a second connector is coupled to an end of the grid cord, and wherein the second connector is configured to be coupled with the receptacle for grid-to-load power supply.

Implementations can include any or all of the following features. The power strip further comprises a voltage divider, wherein the first charging gun has a proximity pin, and wherein coupling of the first connector with the receptacle causes the voltage divider to be coupled to the proximity pin through the first cord. The voltage divider includes at least a resistor, wherein coupling the resistor to the proximity pin through the first cord lowers a voltage at the proximity pin.

BRIEF DESCRIPTION OF DRAWINGS

Like reference symbols in the various drawings indicate like elements.

DETAILED DESCRIPTION

Figure 1:
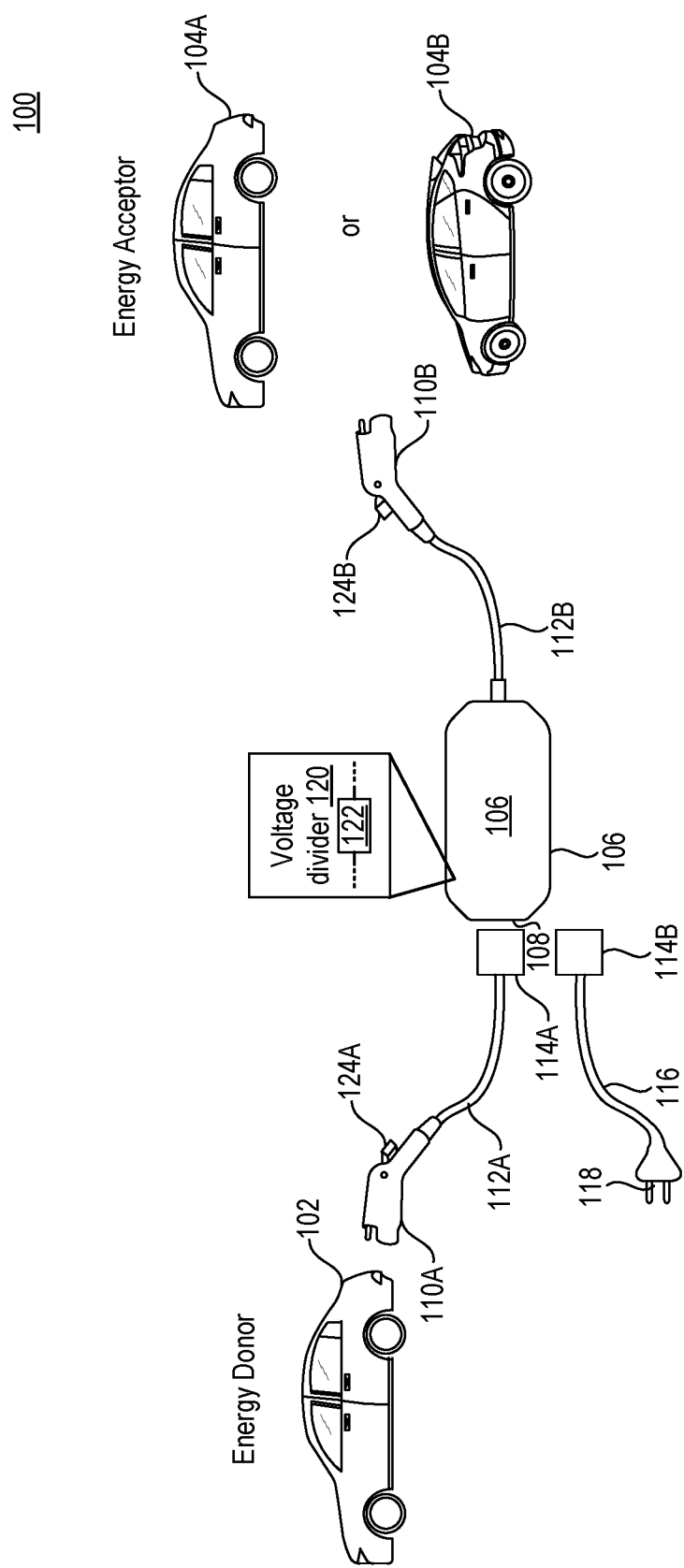
FIG. 1 shows an example of a cord set that can perform vehicle-to-vehicle (V2V) or grid-to-vehicle (G2V) charging.

This document describes examples of systems and techniques for facilitating use of the energy storage of an electric vehicle (EV) to provide power to one or more other electric apparatuses. For example, the other electric apparatus can be another EV that uses the received electricity to charge its own energy storage. As another example, the other apparatus can be an electric device that receives its power from the EV by being plugged into a power strip coupled to the EV. Cord sets described herein can facilitate communication schemes that enable charging of an EV with power from a grid, as well as conveying electricity from the EV to other equipment. This can enable use of the EV's battery pack as a mobile energy storage.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. An EV can be powered exclusively by electricity, or can use one or more other energy sources in addition to electricity, to name just a few examples. As used herein, an EV includes an onboard energy storage, sometimes referred to as a battery pack, to power one or more electric motors. Two or more EVs can have different types of energy storages and/or different sizes thereof.

Examples described herein refer to vehicle-to-vehicle (V2V) charging. As used herein, V2V is performed with at least two EVs, wherein a first EV serves as a donor EV for energy and one or more second EVs serve as acceptor EVs for energy. The V2V charging involves discharging the donor EV and charging the second EV(s). Charging an energy storage involves supplying energy into the storage and increasing its state of charge. Discharging an energy storage involves removing energy from the storage and decreasing its state of charge. As such, in V2V charging there is both charging and discharging involved, of separate EVs. Moreover, an electrical connector that is coupled to an EV is sometimes referred to as a charging gun. In V2V charging, respective charging guns are coupled to each of the EVs. That is, charging guns are used for both the donor EV and the acceptor EV(s). When an EV is instead being charged with electricity from a grid, this can be referred to as grid-to-vehicle (G2V) charging.

Examples described herein refer to vehicle-to-load (V2L) power supply. As used herein, in V2L power supply an EV serves as a donor EV for energy for one or more loads. The V2L power supply involves discharging of the EV and consumption of electrical energy by the load(s). When the load is instead supplied with electricity from a grid, this can be referred to as grid-to-load (G2L) power supply.

Examples described herein refer to a power grid, or a grid for short. As used herein, a grid that supplies power includes any of multiple types of networks for delivering electricity from a producer to one or more consumers. A grid can be owned and/or operated by any of multiple types of actors, including, but not limited to, a public entity (e.g., a municipality, city, state, or country) that may act through one or more utility companies, or a private entity (e.g., a corporation, another private enterprise, or an individual). A grid can deliver electricity to a building at any of multiple levels of power.

Examples described herein describes certain components of an electric circuit as being coupled to each other. As used herein, being coupled means to be electrically coupled, unless otherwise stated.

FIG. 1 shows an example of a cord set 100 that can perform V2V or G2V charging. The cord set 100 can be used with one or more other examples described elsewhere herein. The cord set 100 is here shown as being associated with a donor EV 102 and acceptor EVs 104A-104B. Each of the donor EV 102 and the acceptor EVs 104A-104B can be any of multiple types of EV having an onboard energy storage (e.g., battery pack) that can be charged from an external power source. The donor EV 102 and the acceptor EV 104A are here shown as being the same model of EV, whereas the acceptor EV 104B is a different EV model (e.g., from the same or a different manufacturer) from the donor EV 102 and the acceptor EV 104A. The vehicle types that are being shown (e.g., a sedan vehicle, or other type of passenger vehicle) are used for illustrative purposes only.

The cord set 100 includes electric-vehicle supply equipment (EVSE) 106. The EVSE 106 includes circuitry for communicating with the donor EV 102 and the acceptor EVs 104A-104B. The EVSE 106 can be configured for power flow in a left-to-right direction in the present illustration. The EVSE 106 has a receptacle 108 for electric connection. Any type of electrical connector that is compatible with the intended levels of current and voltage, and that supports adequate communication ability, can be used. In some implementations, the receptacle 108 is configured for being used with AC mains electricity.

The cord set 100 includes a charging gun 110A coupled to an end of a cord 112A. A connector 114A is coupled to an opposite end of the cord 112A from the charging gun 110A. The connector 114A is configured to be coupled with the receptacle 108 for V2V charging. For example, in such V2V charging, the EV 102 can be the donor vehicle.

The cord set 100 includes a charging gun 110B coupled to an end of a cord 112B. An opposite end of the cord 112B from the charging gun 110B can be coupled to the EVSE 106. For example, the opposite end can be permanently attached to the EVSE 106, or the opposite end can have a connector (e.g., a plug and corresponding receptacle) that facilitates removable coupling with the EVSE 106.

The charging guns 110A-110B can be any type(s) of charging gun compatible with one or more of the EVs. For example, multiple power pins and one or more control pins can be included to facilitate communications and transfer of electricity through the associated cord.

The cord set 100 includes a grid cord 116. A connector 114B is coupled to an end of the grid cord 116. The connector 114B is configured to be coupled with the receptacle 108 for G2V charging. For example, in such G2V charging, any of the EVs 102 or 104A-104B can be the EV being charged. A grid plug 118 is coupled to an opposite end of the grid cord 116 from the connector 114B.

As mentioned, when the connector 114A is coupled to the receptacle 108 the cord set 100 can perform V2V charging, and when the connector 114B is coupled to the receptacle 108 the cord set 100 can perform G2V charging. The cord set 100 can communicate to one or more of the EVs 102 or 104A-104B whether it is the cord 112A, or the grid cord 116, that is coupled to the receptacle 108. Namely, the charging guns 110A-110B may be substantially identical to each other, and the EV that has either of them plugged in needs to know whether it will act as a donor EV or as an acceptor EV.

The EVSE 106 can include a voltage divider 120, here shown in an enlarged inset. The voltage divider 120 can be coupled to the circuitry of the EVSE 106. When the connectors 114A-114B are coupled to the receptacle 108, the voltage divider 120 can be coupled to the circuitry so as to be included in a proximity-pin line. The voltage divider 120 can include at least one resistor 122. The coupling of the voltage divider 120 to the circuitry of the EVSE 106 can correspond to either including the resistor 122 in the proximity-pin line (for V2V charging), or not including the resistor 122 in the proximity-pin line (for G2V charging). Both the connectors 114A and 114B will couple to the voltage divider 120. The connectors 114A and 114B have different internal designs, and hence, when coupled to the voltage divider 120, they will generate different detectable voltages. The EVSE 106 and the vehicle can detect the corresponding voltages for the connectors 114A and 114B to decide the states.

Any of the charging guns 110A-110B can have one or more actuatable features. In some implementations, the charging gun 110A has a button 124A, and the charging gun 110B has a button 124B. For example, each of the buttons 124A-124B can control an electric relay or other switch (sometimes referred to as a latch).

Figure 2:
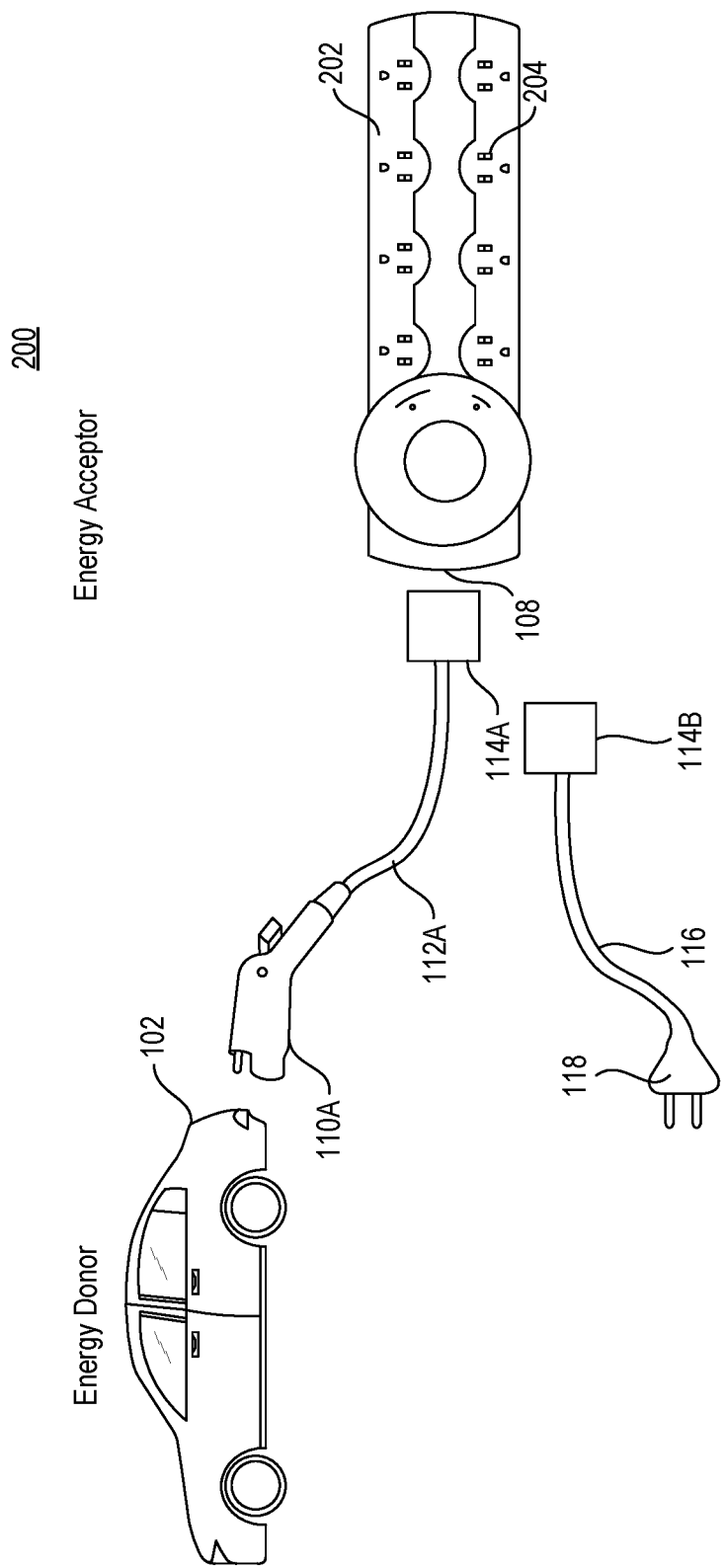
FIG. 2 shows an example of a cord set that can perform vehicle-to-load (V2L) or grid-to-load (G2L) power supply

FIG. 2 shows an example of a cord set 200 that can perform V2L or G2L power supply. The cord set 200 can be used with one or more other examples described elsewhere herein. The cord set 200 is here shown as being associated with the donor EV 102.

The cord set 200 includes a power strip 202. The power strip 202 includes circuitry for communicating with the donor EV 102. The power strip 202 can be configured for power flow in a left-to-right direction in the present illustration. The power strip 202 has the receptacle 108 for electric connection.

The cord set 200 includes the charging gun 110A coupled to the end of the cord 112A, and the connector 114A is coupled to the opposite end of the cord 112A. For example, in V2L power supply, the EV 102 can be the donor vehicle. The power strip 202 includes one or more receptacles 204. An electric component can be plugged into the receptacle 204 to receive electricity through the power strip 202.

The cord set 200 includes the grid cord 116, with the connector 114B coupled to the end thereof, and the grid plug 118 is coupled to an opposite end of the grid cord 116. For example, in G2L power supply, the electric component plugged into the receptacle 204 can be provided with electricity from the grid.

As mentioned, when the connector 114A is coupled to the receptacle 108 the cord set 200 can perform V2L power supply, and when the connector 114B is coupled to the receptacle 108 the cord set 200 can perform G2L power supply. The cord set 200 can communicate to the EV 102 that the cord 112A is coupled to the receptacle 108. Namely, the EV 102 that has the charging gun 110A plugged in needs to know whether it will act as a donor EV or be charged with energy. The power strip 202 can include the voltage divider 120 (FIG. 1) coupled to the circuitry of the power strip 202. The voltage divider 120 can include at least the resistor 122. The coupling of the voltage divider 120 to the circuitry of the power strip 202 can correspond to either including the resistor 122 in the proximity-pin line (for V2L power supply).

Figure 3:
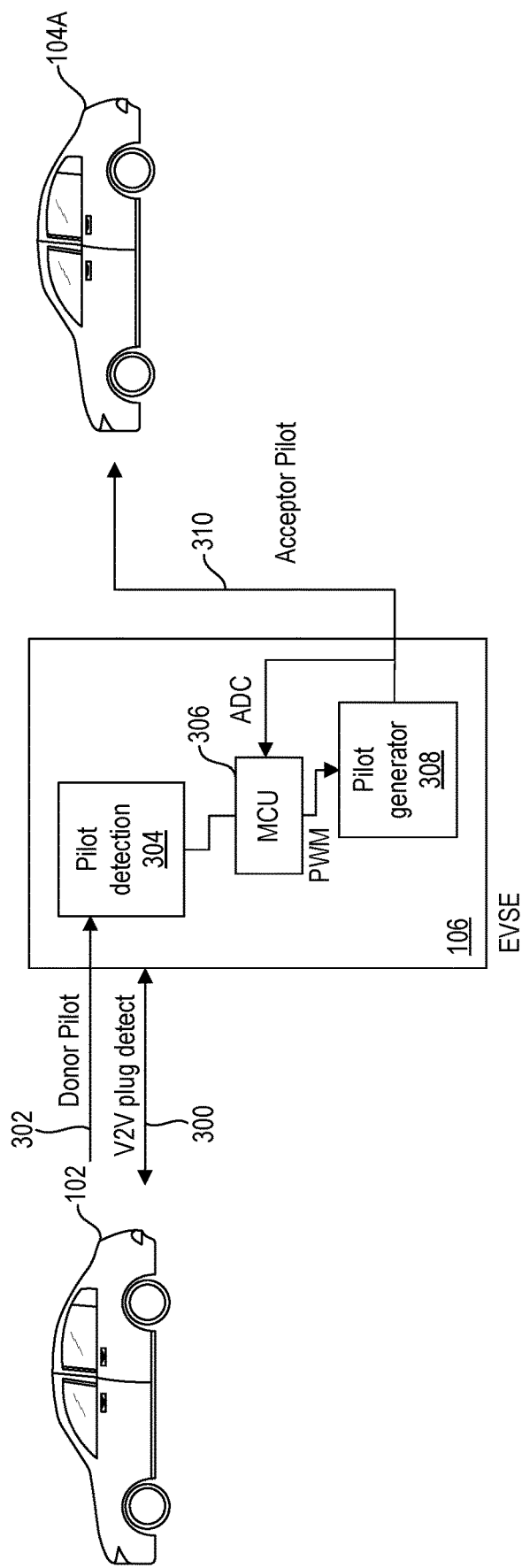
FIG. 3 shows an example of communication flows relating to EVs.

FIG. 3 shows an example of communication flows relating to the EVs 102 and 104A. The communication flows can be used with one or more other examples described elsewhere herein. The EVs 102 and 104A are used for illustrative purposes only. For example, in a different implementation the communication flows can occur with regard to EVs that are not of the same type as each other.

The communication flows include a V2V plug detection 300. In some implementations, the EV 102 provides a voltage on a proximity pin at its charge port, which proximity pin is coupled to the EVSE 106 by the cord. The EV 102 can detect the resulting voltage at the proximity pin. For at least one specific detected voltage, the detection triggers the EV 102 to initiate G2V charging. This can involve the EV 102 receiving a signal 302 (here, an input signal) on a pilot pin regarding the G2V charging. For example, the EVSE 106 can inform the EV 102 what current level(s) the EVSE 106 can provide.

For at least one other specific detected voltage, the detection triggers the EV 102 to initiate V2V charging. Contrary to the previous example where an input signal was received at the pilot pin, V2V can instead involve the signal 302 on the pilot pin being an output signal from the EV 102 regarding the V2V charging. For example, the EV 102 can inform the EVSE 106 what current level(s) the EV 102 can provide. Circuitry 304 of the EVSE 106 (e.g., a pilot detector) can be invoked with the signal 302 in both G2V and V2V charging.

The EVSE 106 includes a controller (sometimes referred to as an MCU) 306. The controller 306 can handle communications to and from the EVSE 106 in G2V and V2V charging. The EVSE 106 includes circuitry 308 (e.g., a pilot generator) coupled to the controller 306. In some implementations, the circuitry 308 can generate a signal 310 to the EV 104A. For example, the signal 310 can be referred to as an acceptor pilot signal and can be detected at a pilot pin of the EV 104A. One or both of the circuitries 304 and 308 can handle communication based on pulse width modulation (PWM) signals. Examples of signaling are provided below.

Examples described herein regarding communication flows during G2V and V2V charging also apply, with modifications, to scenarios that involve V2L power supply or G2L power supply. For example, the power strip 202 (FIG. 2) can include some or all of the described circuitry of the EVSE 106.

Figure 4:
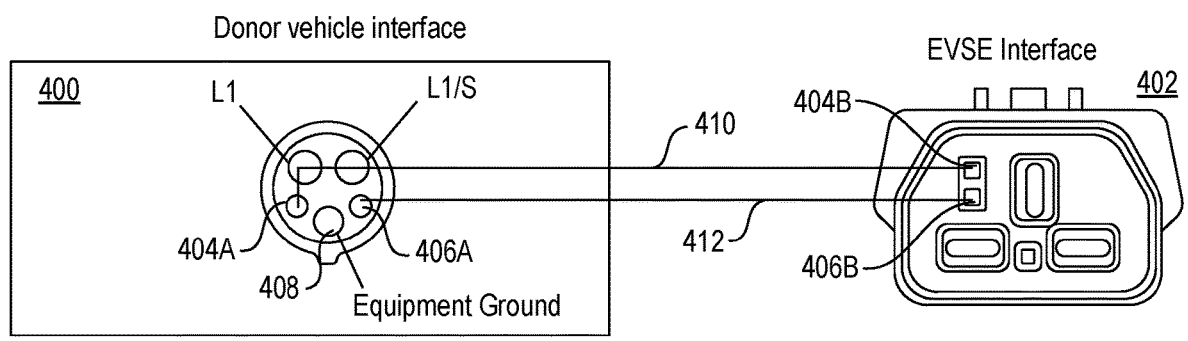
FIG. 4 shows an example of pin mapping.

FIG. 4 shows an example of pin mapping. Any or all of the pins described can be used with one or more other examples described elsewhere herein. These examples involve a donor vehicle interface 400 and an EVSE interface 402. The donor vehicle interface 400 can include power pins (here labeled L1 and L2/N, respectively) for conveying electricity to the EV during charging, or from the EV when the EV serves as a donor vehicle. The donor vehicle interface 400 includes a proximity pin 404A, a pilot pin 406A, and an equipment ground pin 408. The EVSE interface 402 includes some corresponding pins, such as a proximity pin 404B and a pilot pin 406B.

A voltage level 410 can be generated and be forwarded in either direction between the proximity pins 404A-404B. The voltage level 410 is generated when either of the the connectors 114A and 114B (FIG. 1) is plugged in. For example, the voltage level 410 can be based on detection of a negative temperature coefficient resistor at the EVSE. As another example, the voltage level 410 can be based on detection of whether V2V charging should be initiated.

A signal 412 can be generated and be forwarded in either direction between the pilot pins 406A-406B. For example, the signal 412 can involve detection of a grid plug. As another example, the signal 412 can involve transmitting a control pilot signal from a donor EV.

Figure 5:
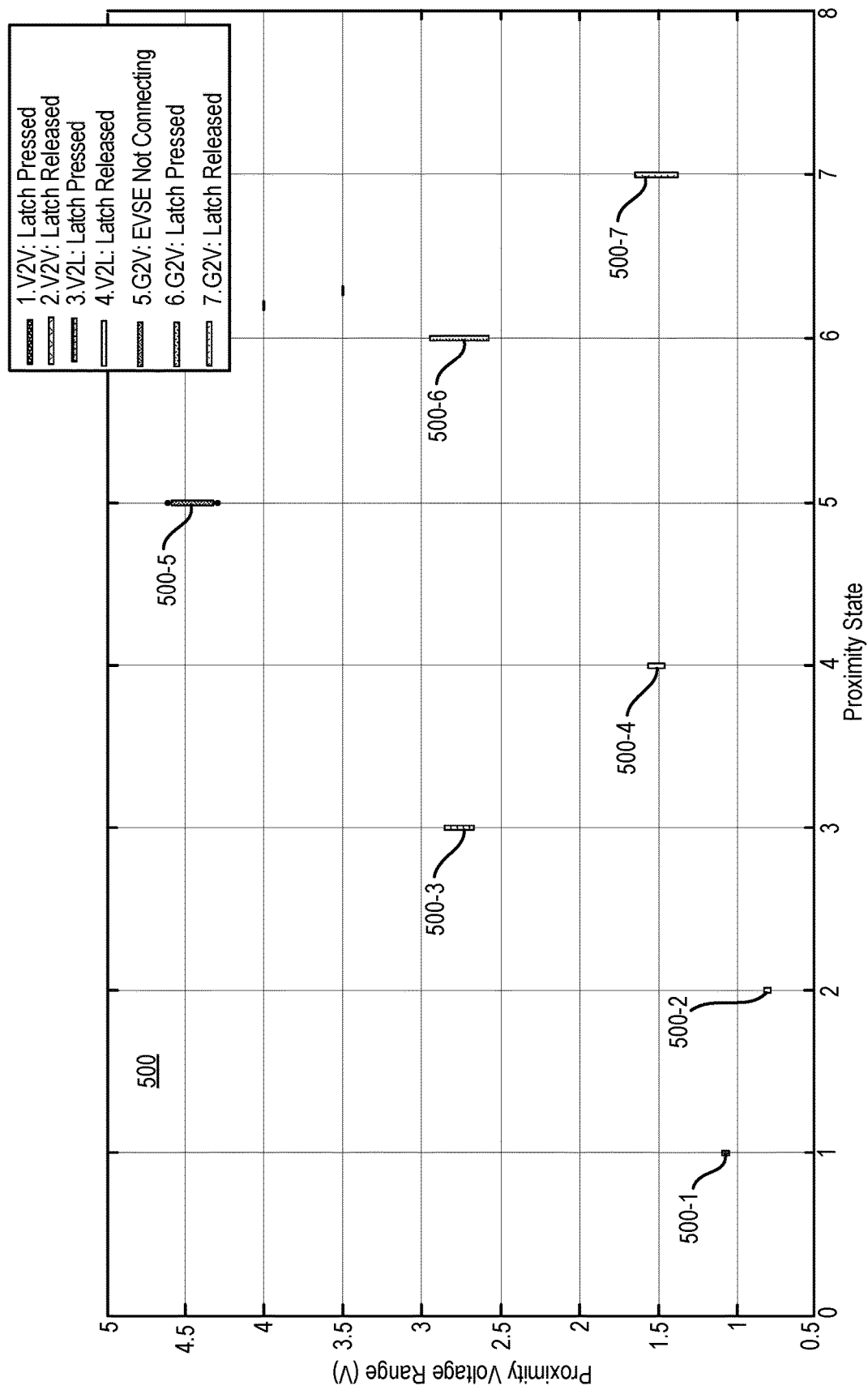
FIG. 5 shows an example of detectable states for V2V, V2L, or G2V charging or power supply.

FIG. 5 shows an example of detectable states 500 for V2V, V2L, or G2V charging or power supply. Any or all of the detectable states 500 can be used with one or more other examples described elsewhere herein. The different states are indicated against a horizontal axis labeled proximity state (e.g., the states can be detected using a pin referred to as a proximity pin). The states are characterized as having voltages in different ranges, such voltages indicated against a vertical axis labeled proximity voltage range. Seven states are shown and are here referred to as states 500-1 through 500-7, respectively. States 500-1 and 500-2 can be associated with V2V charging. States 500-3 and 500-4 can be associated with V2L power supply. States 500-5, 500-6, and 500-7 can be associated with G2V charging.

The state 500-1 can be associated with pressing of a latch on the charging gun that is coupled to the donor EV. For example, the button 124A (FIG. 1) of the charging gun 110A can be pressed to generate the voltage corresponding to the state 500-1. The state 500-2 can correspond to the latch being released. In some implementations, the state 500-1 is a quick state and the state 500-2 is the steady state when the button is released. The states 500-1 and 500-2 can have a lower voltage than other states of the detectable states 500. As such, the invocation of V2V charging, which can be done by coupling the voltage divider (e.g., the resistor 122 in FIG. 1) to the proximity pin through the cord, can involve lowering a voltage at the proximity pin.

Figure 6:
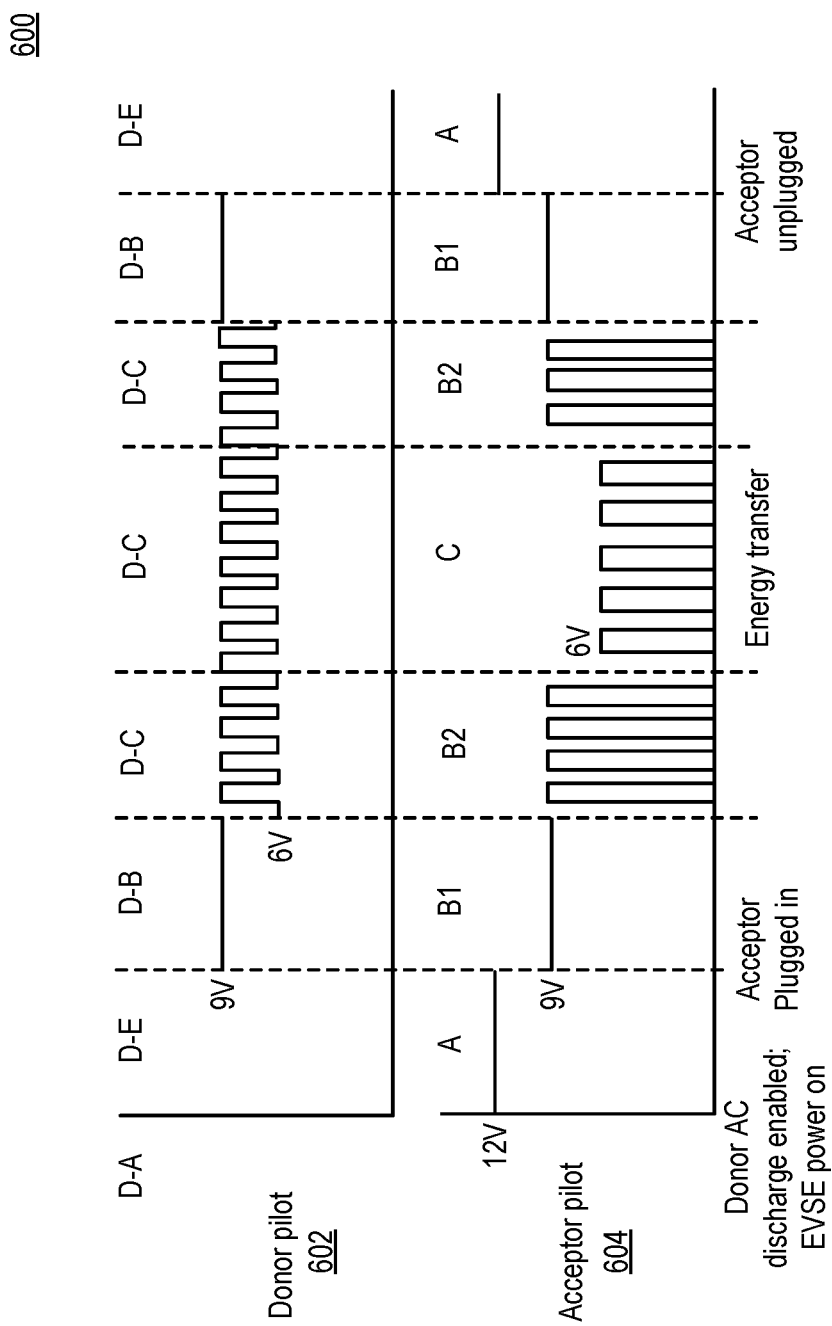
FIG. 6 shows an example of a pulse width modulation diagram relating to V2V charging.

FIG. 6 shows an example of a pulse width modulation (PWM) diagram 600 relating to V2V charging. The PWM diagram 600 can be used with one or more other examples described elsewhere herein. The PWM diagram 600 includes a diagram 602 relating to signals on the pilot pin of a donor EV, and a diagram 604 relating to signals on the pilot pin of an acceptor EV. Different states are indicated against a horizontal axis. In the various states, the PWM signal can have voltages in different ranges, such voltages indicated against respective vertical axes for the diagrams 602 and 604. In the following, the various states are discussed in order from left to right in the PWM diagram 600.

In state D-E for the donor, no PWM is generated. In the corresponding state A for the acceptor, a 12V signal can be generated. This state can correspond to a charging gun not being plugged into the acceptor EV, wherein no connection is made. For example, AC discharge of the donor EV can be enabled, and the EVSE can be powered on.

In state D-B for the donor, a 9V signal can be generated. In the corresponding state B1 for the acceptor, a 9V signal can be generated. Once the charging gun in plugged into the acceptor EV, the voltage can be automatically pulled down to 9V.

In state D-C for the donor, a 6-9V PWM signal is generated. In the corresponding state B2 for the acceptor, a 9V PWM signal can be generated. The EVSE can detect a state and generate a 9V PWM signal.

In state D-C for the donor, the donor can maintain the 6-9V PWM signal. In the corresponding state C for the acceptor, a 6V PWM signal can be generated. The acceptor EV can detect the 9V PWM, and understand a duty ratio of the PWM signal about current limitation. The acceptor EV can therefore pull down the PWM signal to a 6V PWM. The acceptor EV can receive the same level of current that the donor EV is capable of discharging, or a lesser level if the EVSE cannot deliver the full level. State C for the acceptor is where energy is transferred from the donor EV to the acceptor EV. The duty ratio can change during this process. Both the donor and the acceptor can change the duty ratio. For example, the donor regulates its production of current based on state of charge. The EVSE can derate itself based on its temperature.

In state D-C for the donor, the 6-9V PWM signal can be generated. In the corresponding state B2 for the acceptor, a 9V PWM signal can be generated. This can be the reverse of the initialization process. The acceptor EV can stop the process by changing the PWM signal from 6V to 9V.

In state D-B for the donor, a 9V signal can be generated. In the corresponding state B1 for the acceptor, a 9V signal can be generated. The EVSE can detect the stopping by the acceptor EV and stop the process.

In state D-E for the donor, no signal is generated. In the corresponding state A for the acceptor, a 12V signal can be generated. This state can correspond to a charging gun not being plugged into the acceptor EV, wherein no connection is made.

Figure 7:
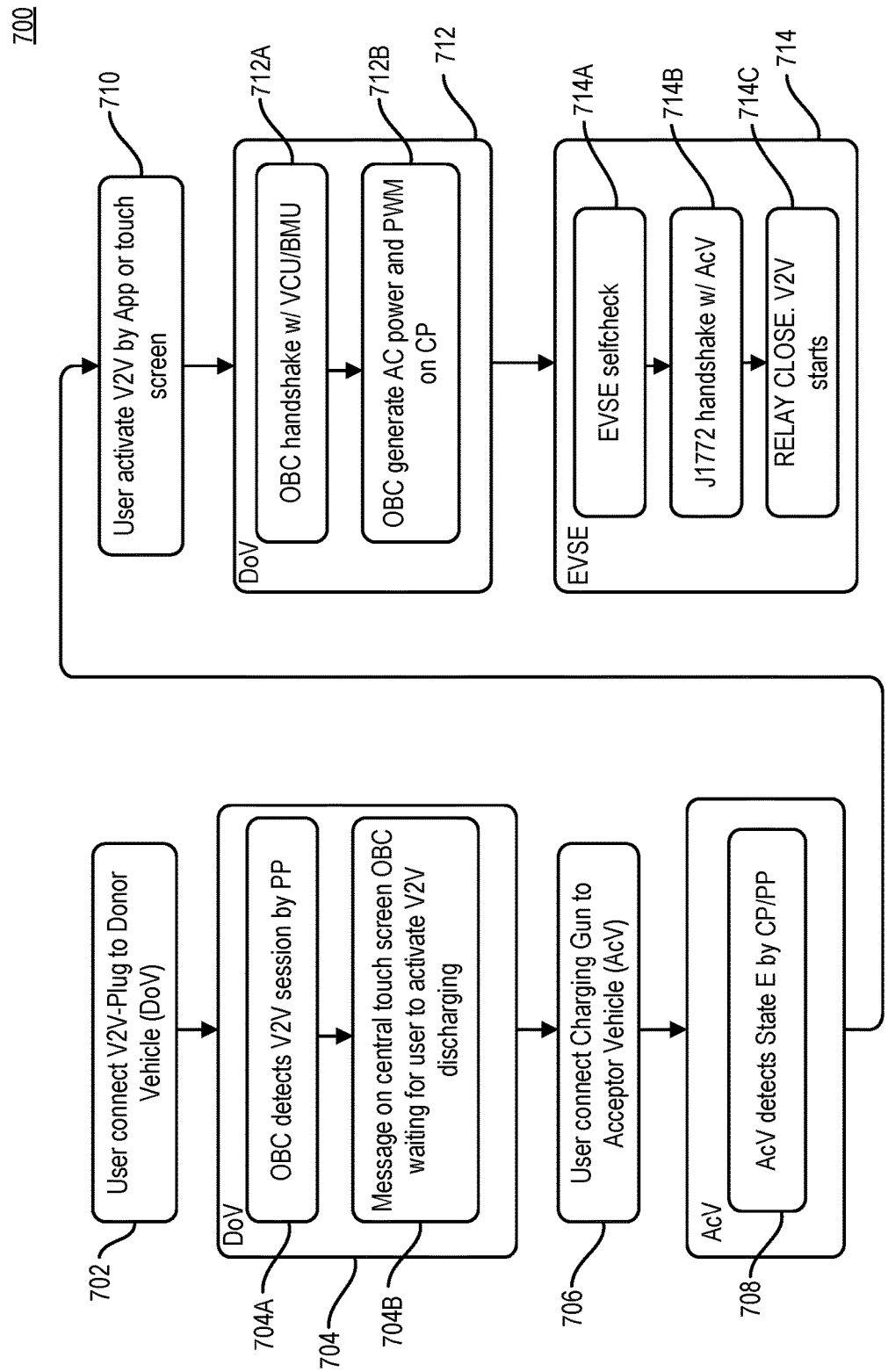
FIG. 7 shows an example of a state diagram regarding a starting sequence for V2V charging.

FIG. 7 shows an example of a state diagram 700 regarding a starting sequence for V2V charging. The state diagram 700 can be used with one or more other examples described elsewhere herein. Operations 702, 706, and 710 correspond to actions taken by a user. Operations 704 and 712 correspond to actions taken and/or states entered into by, a donor EV. Operation 708 corresponds to an action taken and/or state entered into by, an acceptor EV. Operation 714 corresponds to actions taken and/or states entered into by, an EVSE.

In operation 702, a user can connect a V2V plug to a donor EV.

In operation 704A, an onboard charger (OBC) of the donor vehicle can detect a V2V session by way of a proximity pin (PP). In operation 704B, the donor EV can present a message to a user (e.g., on a touchscreen device) that V2V discharging is available to be initiated. For example, the message can prompt the user for input and indicate that the onboard charger waits for the user to activate V2V discharging.

In operation 706, a user can connect a charging gun to an acceptor EV.

In operation 708, the acceptor EV can detect a state (e.g., state D-E for the acceptor pilot in FIG. 6). The detection can be made based on a control pilot (CP; e.g., the donor EV's PWM signal) on the pilot pin and a proximity pin signal.

In operation 710, a user can activate V2V charging using an application or by way of a touchscreen input. For example, an application associated with the donor EV can run on a mobile electronic device controlled by the user. The application can activate V2V charging.

In operation 712A, the onboard charger of the donor EV can engage in a handshaking procedure with a vehicle control unit (VCU) and/or a battery management unit (BMU). In operation 712B, the onboard charger can generate AC power from the donor EV's energy storage, and can generate a PWM signal on the control pilot.

In operation 714A, the EVSE can perform a self-check procedure. In operation 714B, the EVSE can perform a charging gun handshake (e.g., according to the J1772 standard from SAE International) with the acceptor EV. In operation 714C, the EVSE can close its relay on the power line(s) and V2V charging can begin.

Figure 8:
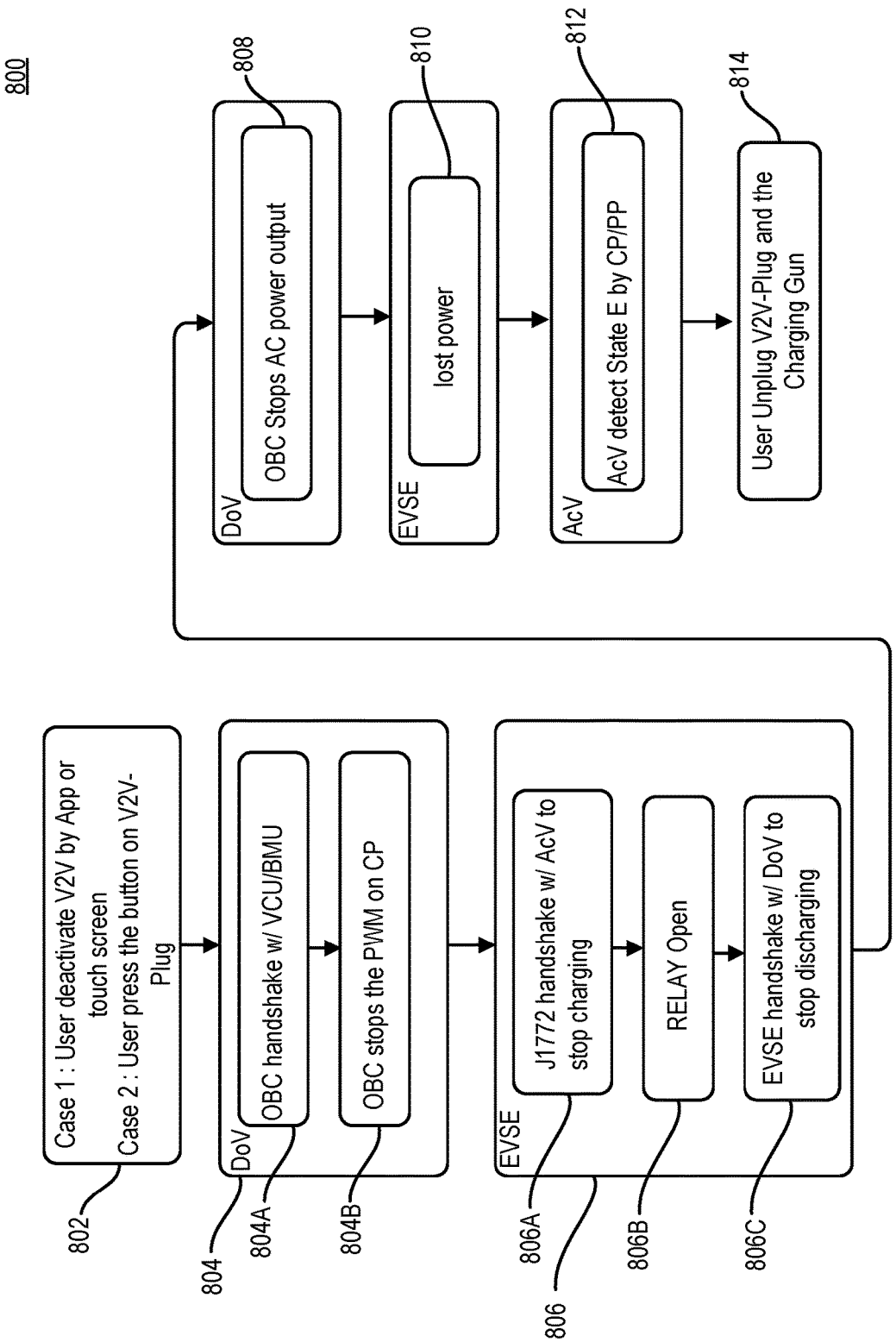
FIGS. 8-9 show examples of state diagrams regarding stopping sequences for V2V charging.
Figure 9:
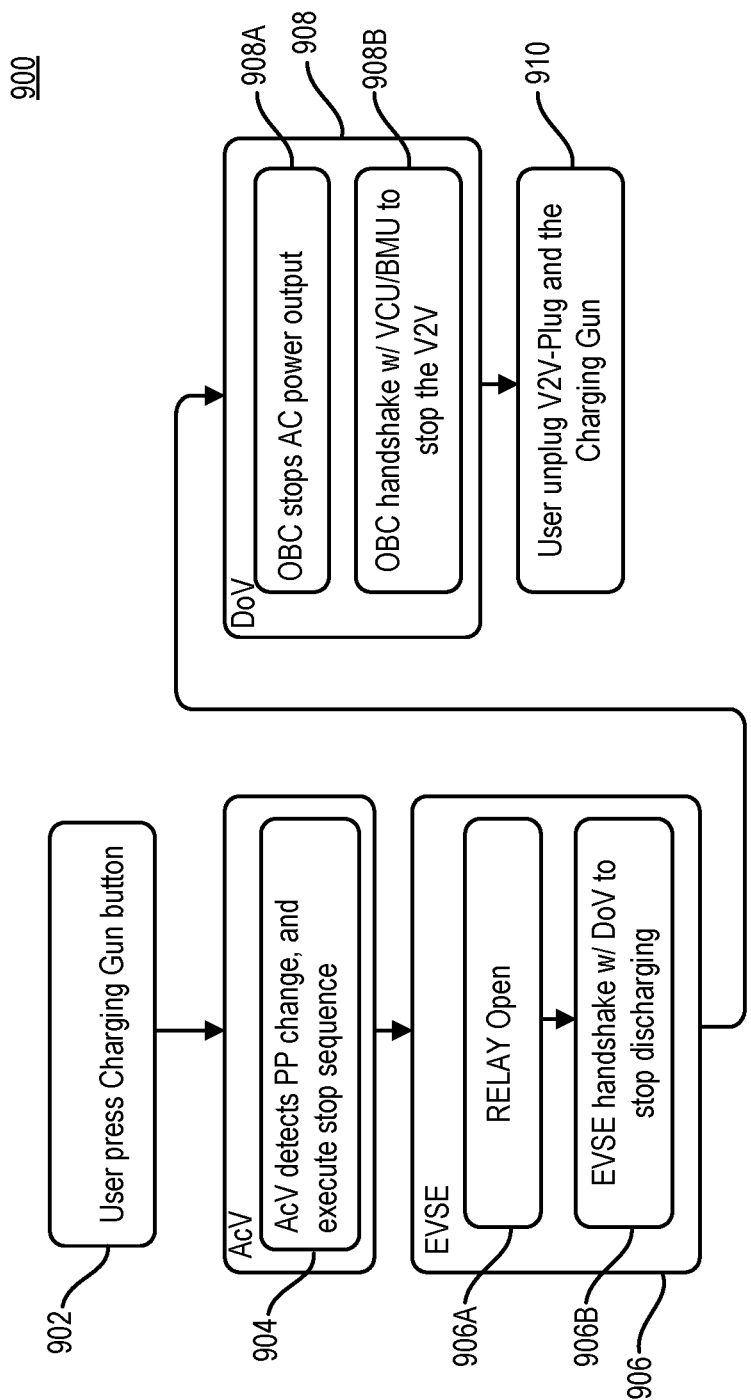

FIGS. 8-9 show examples of state diagrams regarding stopping sequences for V2V charging. FIG. 8 shows an example of a state diagram 800 regarding stopping (e.g., terminating) V2V charging using an application, or a touchscreen, or a V2V plug button for the donor EV. FIG. 9 shows an example of a state diagram 900 regarding stopping (e.g., terminating) V2V charging using a charging gun button for the acceptor EV. The state diagrams 800 and/or 900 can be used with one or more other examples described elsewhere herein.

Operations 802 and 814 correspond to actions taken by a user. Operations 804 and 808 correspond to actions taken and/or states entered into by, a donor EV. Operation 812 corresponds to an action taken and/or state entered into by, an acceptor EV. Operations 806 and 810 correspond to actions taken and/or states entered into by, an EVSE.

Beginning with the state diagram 800, at an operation 802, in a first case, a user can use an application or a touchscreen input to deactivate V2V charging. This can be done by making an input that generates a stop command. In a second case, the user can press a button on the V2V-plug (e.g., the charging gun plugged into the donor EV).

In operation 804A, the onboard charger of the donor EV can engage in a handshaking procedure with a VCU and/or a BMU. In operation 804B, the onboard charger can stop the PWM signal on the control pin.

In operation 806A, the EVSE can perform a handshake (e.g., according to the J1772 standard from SAE International) with the acceptor EV to stop charging. In operation 806B, the EVSE can open its relay on the power line(s). In operation 806C, the EVSE can engage in a handshake procedure with the donor EV to stop the discharging from the donor.

In operation 808, the onboard charger of the donor EV can stop its AC power output.

In operation 810, the EVSE can detect that it has lost power.

In operation 812, the acceptor EV can detect a state (e.g., state D-E for the donor pilot in FIG. 6). The detection can be made based on a control pilot (CP; e.g., the donor EV's PWM signal) on the pilot pin and a proximity pin signal.

In operation 814, the user can unplug the V2V-plug from the donor EV and the charging gun from the acceptor EV.

Turning now to the state diagram 900, operations 902 and 910 correspond to actions taken by a user. Operation 904 corresponds to an action taken and/or state entered into by, an acceptor EV. Operation 906 corresponds to actions taken and/or states entered into by, an EVSE. Operation 908 corresponds to actions taken and/or states entered into by, a donor EV.

In operation 902, the user can press the button on the charging gun coupled to the acceptor EV.

In operation 904, the acceptor EV can detect a change on a proximity pin as a result of the button press, and can execute a stop sequence in response.

In operation 906A, the EVSE can open its relay on the power line(s). In operation 906B, the EVSE can engage in a handshaking procedure with the donor EV to stop its discharging.

In operation 908A, the onboard charger of the donor EV can stop its AC power output. In operation 908B, the onboard charger can engage in a handshaking procedure with a VCU and/or a BMU to stop the V2V charging.

In operation 910, the user can unplug the V2V plug from the donor EV, and unplug the charging gun from the acceptor EV.

Figure 10:
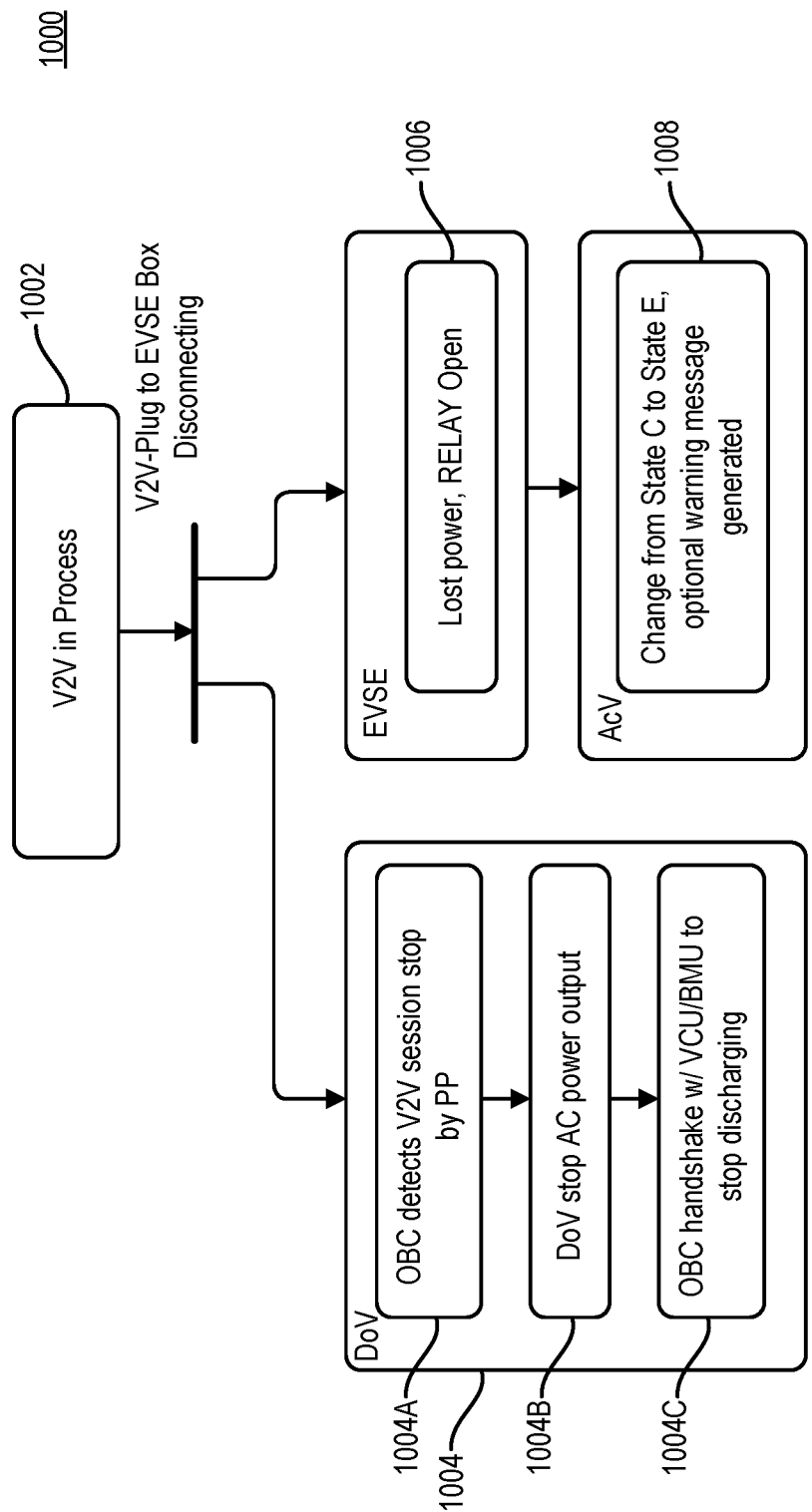
FIGS. 10-11 show examples of state diagrams regarding detecting a fault for V2V charging.
Figure 11:
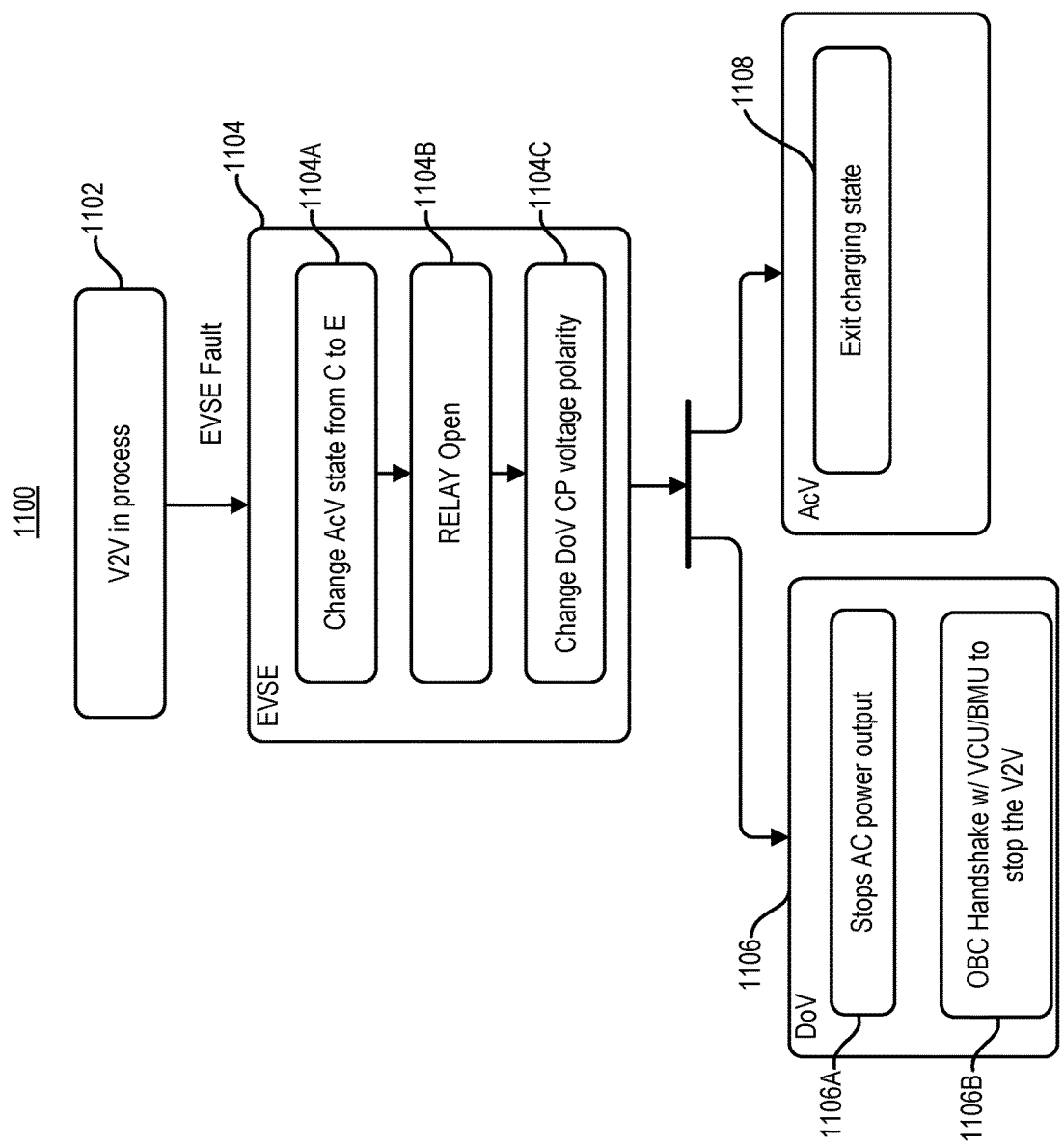

FIGS. 10-11 show examples of state diagrams regarding detecting a fault for V2V charging. FIG. 10 shows an example of a state diagram 1000 regarding detection of a fault during V2V charging when a V2V plug is disconnected from the EVSE box. FIG. 11 shows an example of a state diagram 1100 regarding detection of a fault during V2V charging when the EVSE detects a fault in itself. The state diagrams 1000 and/or 1100 can be used with one or more other examples described elsewhere herein.

Operation 1002 corresponds to an ongoing process. Operation 1004 corresponds to actions taken and/or states entered into by, a donor EV. Operation 1006 corresponds to an action taken and/or state entered into by, an EVSE. Operation 1008 corresponds to an action taken and/or state entered into by, an acceptor EV.

In operation 1002, a V2V charging session is in progress.

In operation 1004A, an onboard charger of the donor EV detects a stop of the V2V session by a signal at a proximity pin.

At operation 1004B, the donor EV stops its AC power output.

At operation 1004C, the onboard charger of the donor EV can engage in a handshaking procedure with a VCU and/or a BMU to stop the discharging.

At operation 1006, the EVSE can detect that it has lost power, and can open its relay at the power line(s).

At operation 1008, the acceptor EV can change from state C (e.g., where a 6V PWM signal is generated, see FIG. 6) to state E. For example, in state E the proximity signal can be engaged, but the control pilot is lost. At operation 1008, since the V2V cable is disconnected from the EVSE, the EVSE power supply is lost, and hence the control pilot is lost. However, the proximity pin may be available, and the vehicle may see a valid proximity pin signal, as long as the charging gun is plugged into the vehicle.

Turning now to the state diagram 1100, operation 1102 corresponds to an ongoing process. Operation 1104 corresponds to actions taken and/or states entered into by, an EVSE. Operation 1106 corresponds to an action taken and/or state entered into by, a donor EV. Operation 1108 corresponds to an action taken and/or state entered into by, an acceptor EV.

In operation 1102, a V2V charging session is in progress.

In operation 1104A, an EVSE can change its state from state C (e.g., where a 6V PWM signal is generated, see FIG. 6) to state E. Regarding state E, see description of operation 1008 above.

At operation 1104B, the EVSE can open its relay at the power line(s).

At operation 1104C, the EVSE can change the voltage polarity for the signal at the control pin of the donor EV.

At operation 1106A, the donor EV can stop its AC power output.

At operation 1106B, the onboard charger of the donor EV can engage in a handshaking procedure with a VCU and/or a BMU to stop the V2V session.

At operation 1108, the acceptor EV can exit its charging state.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A cord set comprising:
   electric-vehicle supply equipment (EVSE) comprising circuitry, the EVSE having a receptacle, the receptacle configured for only one of a first cord or a grid cord to be plugged into the receptacle at a time;
   a first charging gun coupled to an end of the first cord, wherein a first connector is coupled to an opposite end of the first cord, and wherein the first connector is configured to be plugged into the receptacle for vehicle-to-vehicle charging;
   a second charging gun coupled to an end of a second cord, wherein an opposite end of the second cord is coupled to the EVSE; and
   the grid cord, wherein a second connector is coupled to an end of the grid cord, wherein the second connector is configured to be plugged into the receptacle for grid-to-vehicle charging.

2. The cord set of claim 1, wherein the EVSE further comprises a voltage divider, wherein the first charging gun has a proximity pin, and wherein plugging the first connector into the receptacle causes the voltage divider to be coupled to the proximity pin through the first cord.

3. The cord set of claim 2, wherein the voltage divider includes at least a resistor, wherein coupling the resistor to the proximity pin through the first cord lowers a voltage at the proximity pin.

4. The cord set of claim 1, wherein the EVSE detects whether the first or second connector is plugged into the receptacle.

5. The cord set of claim 1, wherein each of the first and second charging guns is a J1772 charging gun.

6. The cord set of claim 1, wherein the cord set is configured so that vehicle-to-vehicle charging with the first connector plugged into the receptacle involves the first charging gun being coupled to a donor electric vehicle, and the second charging gun being coupled to an acceptor electric vehicle.

7. The cord set of claim 1, wherein the cord set is configured so that grid-to-vehicle charging with the second connector plugged into the receptacle involves the second charging gun being coupled to an electric vehicle to be charged.

8. A method comprising:
   providing, by a first electric vehicle (EV), a first voltage at a proximity pin, wherein a cord couples the proximity pin to EV supply equipment (EVSE);
   detecting, by the first EV, a second voltage at the proximity pin;
   based on the second voltage having a first level, initiating, by the first EV, grid-to-vehicle charging of the first EV; and
   based on the second voltage having a second level different from the first level, initiating, by the first EV, vehicle-to-vehicle charging with the first EV as a donor vehicle and a second EV as an acceptor vehicle.

9. The method of claim 8, further comprising prompting, in response to the second voltage having the second level, a user for input whether to initiate the vehicle-to-vehicle charging.

10. The method of claim 8, further comprising detecting, by the first EV and for the grid-to-vehicle charging, a third voltage on a pilot pin coupled to the EVSE by the cord, wherein the third voltage represents a level of current available for the grid-to-vehicle charging.

11. The method of claim 8, further comprising providing, by the first EV and for the vehicle-to-vehicle charging, a third voltage on a pilot pin coupled to the EVSE by the cord, wherein the third voltage represents a level of current available for the vehicle-to-vehicle charging.

12. The method of claim 8, further comprising terminating, by the first EV, the vehicle-to-vehicle charging.

13. The method of claim 12, wherein the first EV is associated with an application, the method further comprising receiving, by the first EV, a stop command generated by the application, wherein the first EV terminates the vehicle-to-vehicle charging in response to receiving the stop command.

14. The method of claim 12, wherein the first EV has a touchscreen, the method further comprising receiving, by the first EV, a stop command entered by a user using the touchscreen, wherein the first EV terminates the vehicle-to-vehicle charging in response to receiving the stop command.

15. The method of claim 12, wherein a charging gun is coupled to an end of the cord, wherein the charging gun is coupled to the first EV for the vehicle-to-vehicle charging, wherein the charging gun has a button, and wherein the first EV terminates the vehicle-to-vehicle charging in response to the button being pressed.

16. The method of claim 12, further comprising receiving, by the first EV, a signal from the EVSE, wherein the first EV terminates the vehicle-to-vehicle charging in response to the signal.

17. The method of claim 16, wherein a charging gun is coupled to the second EV for the vehicle-to-vehicle charging, wherein the charging gun has a button, and wherein sending of the signal was triggered by pressing of the button.

18. The method of claim 8, further comprising detecting, by the first EV, a fault in the vehicle-to-vehicle charging, and changing a state of the first vehicle in response to the fault.

19. A cord set comprising:
- a power strip comprising circuitry, the power strip having a receptacle, the receptacle configured for only one of a cord or a grid cord to be plugged into the receptacle at a time;
- a first charging gun coupled to an end of the cord, wherein a first connector is coupled to an opposite end of the cord, and wherein the first connector is configured to be plugged into the receptacle for vehicle-to-load power supply; and
- the grid cord, wherein a second connector is coupled to an end of the grid cord, and wherein the second connector is configured to be plugged into the receptacle for grid-to-load power supply.

20. The cord set of claim 19, wherein the power strip further comprises a voltage divider, wherein the first charging gun has a proximity pin, and wherein plugging the first connector into the receptacle causes the voltage divider to be coupled to the proximity pin through the first cord.

21. The cord set of claim 20, wherein the voltage divider includes at least a resistor, wherein coupling the resistor to the proximity pin through the first cord lowers a voltage at the proximity pin.

\* \* \* \* \*

UNITED STATES PATENT AND TRADEMARK OFFICE
CERTIFICATE OF CORRECTION

PATENT NO. : 12,391,135 B2
APPLICATION NO. : 17/452635
DATED : August 19, 2025
INVENTOR(S) : Mu et al.

Page 1 of 1

It is certified that error appears in the above-identified patent and that said Letters Patent is hereby corrected as shown below:

In the Claims

In Column 13, Claim 20, Line 22, delete "first cord." and insert -- cord. --, therefor.

In Column 13, Claim 21, Line 25, delete "first cord" and insert -- cord --, therefor.

Signed and Sealed this
Twenty-eighth Day of October, 2025

John A. Squires
*Director of the United States Patent and Trademark Office*